(12) United States Patent
Smarr et al.

(10) Patent No.: US 7,996,357 B2
(45) Date of Patent: Aug. 9, 2011

(54) ENABLING SYNCHRONIZATION WITH A DIFFERENCE UNAWARE DATA SOURCE

(75) Inventors: Joseph Smarr, San Jose, CA (US); Ryan A. King, San Mateo, CA (US)

(73) Assignee: Plaxo, Inc., Mountain View, CA (US)

( * ) Notice: Subject to any disclaimer, the term of this patent is extended or adjusted under 35 U.S.C. 154(b) by 318 days.

(21) Appl. No.: 12/040,836

(22) Filed: Feb. 29, 2008

(65) Prior Publication Data

US 2009/0222493 A1 Sep. 3, 2009

(51) Int. Cl.
G06F 17/30 (2006.01)
(52) U.S. Cl. ......................... 707/609; 707/610
(58) Field of Classification Search ............... 707/609, 707/610
See application file for complete search history.

(56) References Cited

U.S. PATENT DOCUMENTS

| | | |
|---|---|---|
| 5,245,656 A | 9/1993 | Loeb et al. |
| 5,263,158 A | 11/1993 | Janis |
| 5,493,105 A | 2/1996 | Desai |
| 5,640,565 A | 6/1997 | Dickinson |
| 5,717,863 A | 2/1998 | Adamson et al. |
| 5,732,218 A | 3/1998 | Bland et al. |
| 5,754,306 A | 5/1998 | Taylor et al. |
| 5,754,938 A | 5/1998 | Herz et al. |
| 5,754,939 A | 5/1998 | Herz et al. |
| 5,774,117 A | 6/1998 | Kukkal et al. |
| 5,835,087 A | 11/1998 | Herz et al. |
| 5,937,162 A | 8/1999 | Funk et al. |
| 5,948,054 A | 9/1999 | Nielsen |
| 5,960,406 A | 9/1999 | Rasansky et al. |
| 5,968,131 A | 10/1999 | Mendez et al. |
| 6,029,195 A | 2/2000 | Herz |
| 6,047,327 A | 4/2000 | Tso et al. |
| 6,073,138 A | 6/2000 | de l'Etraz et al. |
| 6,073,141 A | 6/2000 | Salazar |
| 6,085,192 A | 7/2000 | Mendez et al. |

(Continued)

FOREIGN PATENT DOCUMENTS

WO WO 00/18053 A2 3/2000

(Continued)

OTHER PUBLICATIONS

European Search Report for EP 09 15 3310 completed Jun. 17, 2009.

(Continued)

*Primary Examiner* — Don Wong
*Assistant Examiner* — Kim T Nguyen
(74) *Attorney, Agent, or Firm* — Banner & Witcoff, Ltd.

(57) ABSTRACT

A system and a method are disclosed for updating a master data list with data from a difference unaware information repository and a difference aware information repository. A master synchronization engine synchronizes to the difference unaware information repository and the difference aware information repository via connectors coupled to each information repository. The difference unaware information repository simply exports all the data stored within the repository to its respective connector. The connecter determines the changes made to the data since the last synchronization and the changes are forwarded to the master synchronization engine. The difference aware information repository is capable of determining the changes made to the stored data since the last synchronization and simply forwards the changes to its connector. Each connector forwards the changes to the data in their respective information repositories to a database which updates the master data list.

30 Claims, 5 Drawing Sheets

U.S. PATENT DOCUMENTS

| | | | |
|---|---|---|---|
| 6,112,186 | A | 8/2000 | Bergh et al. |
| 6,131,096 | A | 10/2000 | Ng et al. |
| 6,151,606 | A | 11/2000 | Mendez |
| 6,175,831 | B1 | 1/2001 | Weinreich et al. |
| 6,205,478 | B1 | 3/2001 | Sugano et al. |
| 6,233,623 | B1 | 5/2001 | Jeffords et al. |
| 6,247,043 | B1 | 6/2001 | Bates et al. |
| 6,253,202 | B1 | 6/2001 | Gilmour |
| 6,269,369 | B1 | 7/2001 | Robertson |
| 6,324,587 | B1 | 11/2001 | Trenbeath et al. |
| 6,389,429 | B1 * | 5/2002 | Kane et al. .................. 707/609 |
| 6,393,421 | B1 | 5/2002 | Paglin |
| 6,405,243 | B1 | 6/2002 | Nielsen |
| 6,449,344 | B1 | 9/2002 | Goldfinger et al. |
| 6,529,724 | B1 | 3/2003 | Khazaka et al. |
| 6,564,128 | B2 | 5/2003 | Baird et al. |
| 6,571,281 | B1 | 5/2003 | Nickerson |
| 6,609,128 | B1 * | 8/2003 | Underwood .................. 707/610 |
| 6,633,311 | B1 | 10/2003 | Douvikas et al. |
| 6,654,779 | B1 | 11/2003 | Tsuei |
| 6,654,789 | B1 | 11/2003 | Bliss et al. |
| 6,694,353 | B2 | 2/2004 | Sommerer |
| 6,701,348 | B2 | 3/2004 | Sommerer |
| 6,714,916 | B1 | 3/2004 | Robertson et al. |
| 6,748,402 | B1 * | 6/2004 | Reeves et al. .................. 1/1 |
| 6,760,727 | B1 | 7/2004 | Schroeder et al. |
| 6,778,651 | B1 | 8/2004 | Jost et al. |
| 6,820,204 | B1 | 11/2004 | Desai et al. |
| 6,829,348 | B1 | 12/2004 | Schroeder et al. |
| 6,845,448 | B1 | 1/2005 | Chaganti et al. |
| 6,883,000 | B1 | 4/2005 | Gropper |
| 6,904,434 | B1 * | 6/2005 | Wallach et al. .............. 707/610 |
| 6,944,636 | B1 * | 9/2005 | Starbuck .................. 707/610 |
| 6,957,229 | B1 | 10/2005 | Dyor |
| 6,959,324 | B1 | 10/2005 | Kubik et al. |
| 7,003,546 | B1 | 2/2006 | Cheah |
| 7,007,045 | B2 * | 2/2006 | Starbuck .................. 707/610 |
| 7,007,068 | B2 | 2/2006 | Morkel |
| 7,010,599 | B2 | 3/2006 | Shrinivasan et al. |
| 7,017,109 | B1 | 3/2006 | Douvikas et al. |
| 7,069,308 | B2 | 6/2006 | Abrams |
| 7,080,104 | B2 | 7/2006 | Ring et al. |
| 7,200,592 | B2 * | 4/2007 | Goodwin et al. .............. 706/46 |
| 7,251,647 | B2 * | 7/2007 | Hoblit .................. 707/609 |
| 2001/0002469 | A1 | 5/2001 | Bates et al. |
| 2002/0016857 | A1 | 2/2002 | Harari |
| 2002/0038316 | A1 | 3/2002 | Onyon et al. |
| 2002/0042846 | A1 | 4/2002 | Bottan et al. |
| 2002/0049751 | A1 | 4/2002 | Chen et al. |
| 2002/0049828 | A1 | 4/2002 | Pekarek-Kostka |
| 2002/0055351 | A1 | 5/2002 | Elsey et al. |
| 2002/0076015 | A1 | 6/2002 | Norwitz et al. |
| 2002/0094870 | A1 | 7/2002 | Murray |
| 2002/0099719 | A1 | 7/2002 | Schwitters et al. |
| 2002/0103999 | A1 | 8/2002 | Camnisch et al. |
| 2002/0194207 | A1 | 12/2002 | Bartlett et al. |
| 2003/0069874 | A1 | 4/2003 | Hertzog et al. |
| 2003/0115457 | A1 | 6/2003 | Wildish et al. |
| 2004/0002972 | A1 | 1/2004 | Pather et al. |
| 2004/0019584 | A1 | 1/2004 | Greening et al. |
| 2004/0093317 | A1 | 5/2004 | Swan |
| 2004/0143606 | A1 | 7/2004 | Pauly et al. |
| 2004/0158613 | A1 | 8/2004 | Sommerer |
| 2004/0167813 | A1 | 8/2004 | Robertson et al. |
| 2004/0215793 | A1 | 10/2004 | Ryan et al. |
| 2004/0225525 | A1 | 11/2004 | Weitzman |
| 2005/0091272 | A1 * | 4/2005 | Smith et al. .................. 707/104.1 |
| 2005/0114447 | A1 | 5/2005 | Cameron et al. |
| 2006/0021009 | A1 | 1/2006 | Lunt |
| 2006/0027648 | A1 | 2/2006 | Cheah |
| 2006/0080284 | A1 | 4/2006 | Masonis et al. |
| 2006/0195472 | A1 * | 8/2006 | Cadiz et al. .................. 707/104.1 |
| 2006/0195474 | A1 * | 8/2006 | Cadiz et al. .................. 707/104.1 |
| 2006/0240868 | A1 * | 10/2006 | Kaplan et al. .................. 455/558 |
| 2006/0242210 | A1 * | 10/2006 | Ring et al. .................. 707/204 |
| 2007/0088756 | A1 | 4/2007 | Bruun |

FOREIGN PATENT DOCUMENTS

| | | |
|---|---|---|
| WO | WO 00/67105 | 11/2000 |
| WO | WO 01/09745 A2 | 2/2001 |
| WO | WO 01/33430 | 5/2001 |
| WO | 2007035344 A | 3/2007 |

OTHER PUBLICATIONS

Alwang, B., "Make Contact on the Web," PC Magazine, May 23, 2000, vol. 54.

Amazon.com, Inc., *Important Information About PlanetAll.com*. In cypherpunks@toad.com mailing list [online]. Jun. 6, 2000. Retrieved from the Internet: <URL: http://www.csua.berkeley.edu/cypherpunks>.

Archive of "Contact Networks—Mozilla Firefox," Aug. 15, 2000, www.contact.com, [online] [Archived by http://archive.org on Aug. 15, 2000] Retrieved from the Internet<URL: http://web.archive.org/web/20000815060557/http://www.contact.com/>.

Archive of "Download Software," Contact Networks, Inc., 1999, [online] [Archived by http://archive.org].

Archive of "GoodContacts: Products Overview," www.goodcontacts.com, Nov. 22, 2002, [online] [Archived by http://archive.org on Dec. 9, 2002] Retrieved from the Internet<URL: http//web.archive.org/web/20021209035011/www.goodcontacts.com...>.

Borland, J., *P2P pioneers take on new challenges*. CNET News.com [online], Nov. 12, 2002 [retrieved on Sep. 10, 2003]. Retrieved from the Internet: <URL: http://zdnet.com.com/2100-1106-965371.html>.

Camino, B.M. et al., "Replying to Email with Structured Responses," Int. J. Human—Computer Studies, 1998, pp. 763-776, vol. 48.

"Contact Networks: The First Personal Relationship Management Solution," 22 pages.

"Contact Networks: Keep in Touch Like Never Before," 14 pages.

"Contact Networks: Keep in Touch Like Never Before," presentation for Motorola, 20 pages.

"Contact Networks, Inc.: Executive Summary," 7 pages.

Copeland, K.W. et al., "Electronic Data Interchange: Concepts and Effects," The 7th Annual Conference of the Internet Society, 1997, 11 pages.

"Federal Implementation Guideline for Electronic Data Interchange: ASC X12 003070 Transaction Set 838 Trading Partner Profile," NIST Special Publication 881-48, U.S. Department of Commerce, National Institute of Standards and Technology, 52 pages.

"Federal Implementation Guideline for Electronic Data Interchange: ASC X12 003070 Transaction Set 838C Trading Partner Profile (Confirmation)," NIST Special Publication 881-49, U.S. Department of Commerce, National Institute of Standards and Technology, 18 pages.

Glitman, R., "Contact Managers Made Easy," PC Magazine, Mar. 19, 2003, [online] Retrieved from the Internet<URL:http://www.pcmag.com/print_article2/0,1217,a=38902,00.asp>.

Glitman, R., "Plaxo Contacts," PC Magazine, Mar. 19, 2003, [online] Retrieved from the Internet<URL:http://www.pcmag.com/article2/0,1759,940255,00.asp>.

"Intuwave and Contact Networks Team Up to Bring Next-Generation Contact," News Release, Jul. 27, 2000, [online] Retrieved from the Internet<URL:http://www.prnewswire.co.uk//cgi/news/release ?id=58956>.

Khare, R. et al., "XML: A Door to Automated Web Applications," IEEE Internet Computing, Jul.-Aug. 1997, pp. 78-87.

Lacy, S., *Banking on its customer base, Plaxo raises $8.5 million more*. Silicon Valley / San Jose Business Journal [online], Aug. 4, 2003 [retrieved on Aug. 18, 2003]. Retrieved from the Internet: <URL: http://sanjose.bizjournals.com/sanjose/stories/2003/08/04/smallb4.html>.

Lacy, S., *Out of beta, Plaxo to target businesses with address book product*. Silicon Valley / San Jose Business Journal [online], May 26, 2003 [retrieved on Aug. 18, 2003]. Retrieved from the Internet: <URL: http://sanjose.bizjournals.com/sanjose/stories/2003/05/26/smallb4.html>.

Marshall, M., *Plaxo to launch address software*. Mercury News [online], May 21, 2003 [retrieved on Aug. 18, 2003]. Retrieved from the Internet:: <URL: http://www.siliconvalley.com>.

Miles, S., *Short Take: PlanetAll, GeoCities to link*. CNET News.com [online], Oct. 20, 1997 [retrieved on Aug. 19, 2003]. Retrieved from the Internet: <URL: http://news.com.com/2110-1023_3-204437.html>.

Milewski, A.E. et al., "An Experimental System of Transactional Messaging," ACM Group 9, 1997, 6 pages.

Nardi, B.A. et al., "Collaborative, Programmable Intelligent Agents," Communications of the ACM, Mar. 1998, pp. 96-104, vol. 41, No. 3.

Office Action for Korean Patent Application 10-2006-7011152, Jul. 24, 2007, 81 pages.

PCT International Search Report and Written Opinion, PCT/US04/37539, Jul. 18, 2007, 8 pages.

PlanetAll project description [online]. PlanetAll, Inc., 2003 [retrieved on Aug. 19, 2003]. Retrieved from the Internet: <URL: http://www.tinmonkey.com/projects/planetall_fp.html>.

PlanetAll homepage [online]. PlanetAll, Inc., 1997. Retrieved from the internet: <URL: http://web.archive.org/web/19971014102700/http://www.planetall.com/>.

PlanetAll, Inc., *Planetall Update for Jul. 3, 1999.* in cypherpunks@toad.com mailing list [online]. Jul. 3, 1999. Retrieved from the Internet: <URL: http://www.csua.berkeley.edu/cypherpunks>.

Plaxo Description and Download [online]. NetworkingFiles.com, 2003 [retrieved on Aug. 19, 2003]. Retrieved from the Internet: <URL: http://www.networkingfiles.com/email/plaxo.html>.

*Plaxo announces flagship software application*. Silicon Valley / San Jose Business Journal [online], Nov. 12, 2002 [retrieved on Aug. 18, 2003]. Retrieved from the Internet: <URL: http://sanjose.bizjournals.com/sanjose/stories/2002/11/11/daily17.html>.

*Plaxo Launches; Makes it Easy to Keep Contact Information Up to Date*. Plaxo, Inc. News Release [online], Nov. 12, 2002. Retrieved from the Internet: <URL: http://www.plaxo.com>.

Plaxo Company Overview [online]. Plaxo, Inc. Retrieved from the Internet: <URL: http://www.plaxo.com>.

Plaxo Product Overview [online]. Plaxo, Inc. Retrieved from the Internet <URL: http://web.archive.org/web/20021114192948/http://www.plaxo.com/products>.

U.S. Appl. No. 60/132,560, May 5, 1999, 74 pages.

U.S. Appl. No. 60/127,114, Mar. 31, 1999, 115 pages.

U.S. Appl. No. 60/162,499, Oct. 29, 1999, 226 pages.

Pryma, K., "GoodContacts Keeps Enterprises in Touch," Mar. 7, 2003, Network World Canada, [online] Retrieved from the Internet<URL:http://www.itworldcanada.com/Mobile/ViewArticle.aspx?title=&id=idgml-1af8ec5e-597...>.

Rowlingson, P., Product review of Plaxo software. Computeractive Online [online], Feb. 19, 2003 [retrieved on Aug. 18, 2003]. Retrieved from the Internet: <URL: http://www.computeractive.co.uk/Download/1138899>.

Story, L., *Helping People on the Move Keep Addresses Up to Date*, New York Times, Apr. 5, 2004.

Toth, M. et al., "PlanetAll," Harvard Business School, Mar. 6, 1998, pp. 1-29.

Wolverton, T., Amazon to shut PlanetAll, absorb features. CNET News.com [online], Jun. 8, 2000 [retrieved on Aug. 19, 2003]. Retrieved from the Internet: <URL: http://news.com.com/2100-1017-241648.html>.

"vCard: The Electronic Business Card," Jan. 1, 1997, [online] Retrieved from the Internet<URL:http://www.imc.org/pdi/vcardwhite.html>.

* cited by examiner

ENABLING SYNCHRONIZATION WITH A DIFFERENCE UNAWARE DATA SOURCE

BACKGROUND

1. Field of Art

The present disclosure relates generally to the field of personal information management and more specifically, to synchronizing and updating personal information, such as contact and address information, between multiple interfaces connected to a network.

2. Description of the Related Art

Maintenance of up-to-date contact information between friends, family, business associates, clients, and customers has always been a challenging and a difficult task to manage. More frequently than expected, people change at least some of their contact information, such as phone numbers, fax numbers, mobile phone numbers, electronic mail addresses, physical addresses, and the like. As one example, presently approximately 35% of Internet users change electronic mail addresses annually, approximately 33% of mobile phone numbers are changed annually, and approximately 40 million physical addresses change every year.

Out-of-date contact information leads to personal losses, such as friendships, and business losses, such as missed opportunities that could increase productivity and revenue. For example, inaccurate and low-quality customer data results in bad mailings and staff overhead costing upwards of $600 billion a year to U.S. businesses.

To help manage this large amount of contact related data a number of personal information manager ("PIM") applications have evolved, e.g., Microsoft Outlook®, Eudora Pro®, and the like, for a variety of devices, e.g., personal computers ("PC"), personal digital assistants ("PDA"), smart phones and mobile telephones. Nevertheless, users continue to be challenged with respect to maintaining consistency or separation of information as the number interfaces on which such information resides increases.

Many times, contact related data or contact information is also stored in web mail services such as Google GMail or Yahoo! Mail in addition to PIM applications. With contact information stored in multiple locations, maintenance of the contact information has become even more difficult. In conventional systems, synchronization occurs between the two applications to create one master list of contact information storing the updated contact information.

In conventional synchronization systems, each application exports the contact information and the information is used to update the master list of contact information. A drawback with conventional synchronization systems is that an accurate list of contact information is generally not maintained. In conventional synchronization systems, importing data into the master list of contact information merely adds contact information to the master list resulting in duplicate contact information as many conventional applications are difference unaware information repositories which are only capable of exporting the current state of the stored data. Difference unaware information repositories are not able to and have no need to track changes that occur in the contact information. Thus, tasks such as importing data from difference unaware information repositories during synchronization does not account for information that was deleted or edited from one of the applications. This results in an inaccurate master list of contact information as the deleted contacts continue to be present in the master list of contact information.

To help resolve problems with conventional applications which are difference unaware information repositories, individuals can store contact information in difference aware (e.g., delta aware or full access) applications. Difference aware applications such as Microsoft Outlook®, Yahoo! Mail, AOL Address Book and Microsoft Windows Live Contacts are able to keep record of the changes made to information stored within the application, so that only these changes are accounted for during synchronization. Issues in maintaining accurate contact information arise when users store contact information in both difference aware applications and difference unaware information repositories. Even these difference aware applications have limitations with respect tracking changes in contact information that is retrieved from convention repositories that simply export data. The difference aware applications receive all the contact information stored in the difference unaware repositories during synchronization to update its contact information and are not capable of determining the changes made to the contact information in the difference unaware information repository. Thus, the problem of maintaining an accurate contact information list still is present as contact information is not correctly updated during synchronization of a difference aware application and a difference unaware information repository.

Hence, the present state of the art lacks, inter alia, a system and process to synchronize information with information repositories that are only difference unaware.

SUMMARY

One embodiment of a disclosed system is for synchronization with difference unaware information repositories to update a master list of contact information. The method allows difference unaware information repositories which are only capable of exporting the current state of stored contact information to appear to function as difference aware information repositories which are capable of internally tracking changes made to stored contact information. Tracking changes of contact information stored in difference unaware information repositories is beneficial because very few applications which store contact information are difference aware information repositories. Therefore, by tracking only the changes that occur in difference unaware information repositories, the need to develop additional difference aware information repositories is alleviated as difference unaware information repositories can appear to functionally behave as difference aware information repositories utilizing the disclosed system and process.

Additionally, many users store contact information in various applications which can be difference unaware and difference aware information repositories. The ability to track changes in contact information stored in both types of information repositories provides the most accurate contact information when synchronization occurs to update the master list of contact information.

In one embodiment, a master synchronization engine conducts the process of updating the master list of contact information stored in a master contact information database. The master synchronization engine synchronizes with a first synchronization connector that is coupled to a difference aware information repository and synchronizes with a second synchronization connector that is coupled to a difference unaware information repository. The master synchronization engine requests changes in stored contact information from both the difference aware information repository and the difference unaware information repository via their respective connector. The difference unaware information repository exports the current state of the stored contact information to the second synchronization connector. The second synchronization connector determines changes from the received contact information compared to the last (e.g., previous) export of contact information. These determined changes are exported to the master synchronization engine.

The difference aware information repository exports the tracked changes that occurred in the stored contact information to the first synchronization connector which forwards the tracked changes to the master synchronization engine. The master synchronization engine maps the changes from both the difference aware and difference unaware information repositories to the appropriate form fields in the master contact information database to update the master contact information list. The master contact information list is saved and provides the user with the most accurate list of contact information. Moreover, this master contact information list can be used to update repositories such as the difference aware information repository.

The features and advantages described in the specification are not all inclusive and, in particular, many additional features and advantages will be apparent to one of ordinary skill in the art in view of the drawings, specification, and claims. It is noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
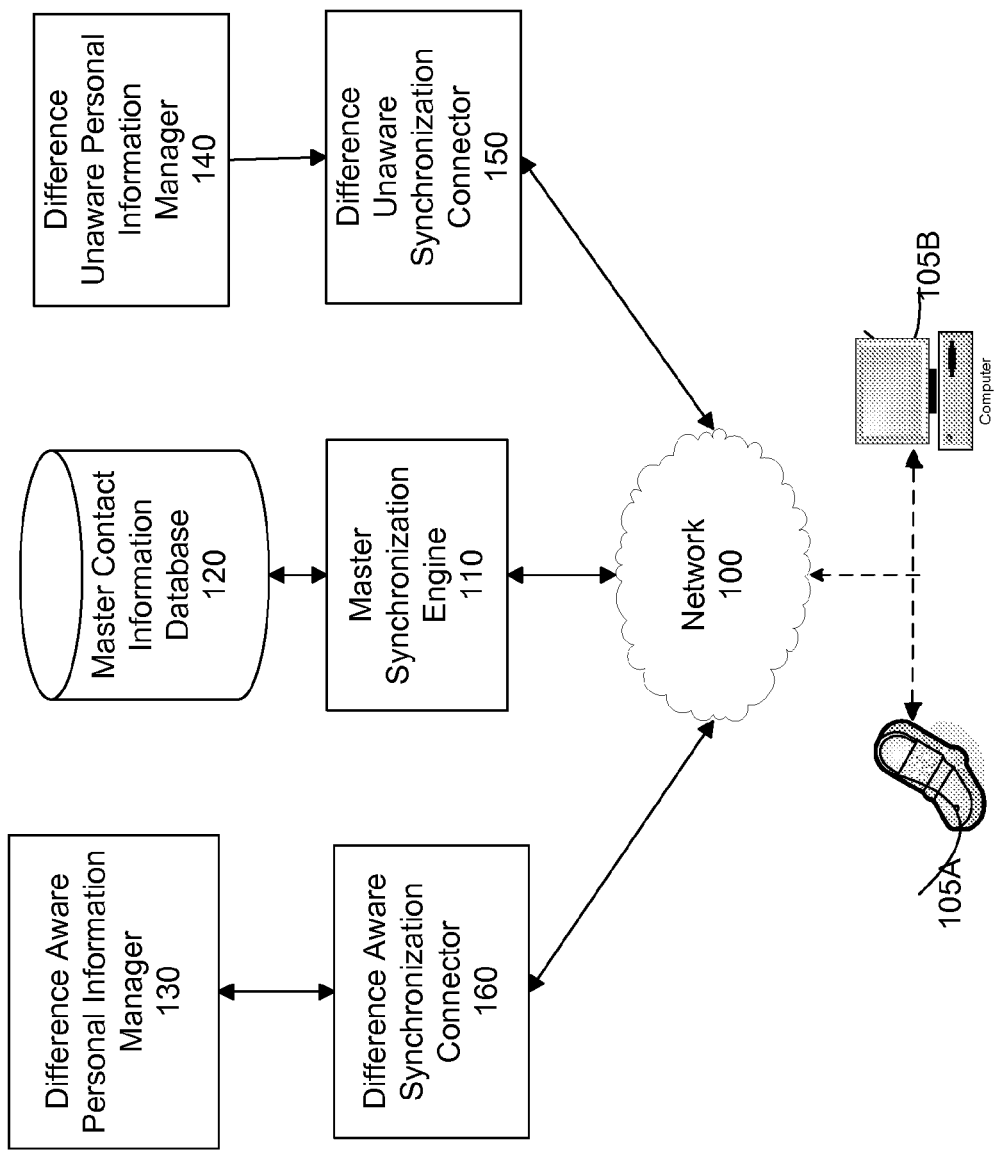
FIG. 1 illustrates one embodiment of a block diagram of the network environment.

Referring now to FIG. 1, there is shown an embodiment of a network environment. For ease of discussion, the technology described is in the context of a contact database configuration. However, the principles described herein are applicable for other similar database applications. The network environment comprises a network 100, a client device 105, a master synchronization engine 110, a master contact information database 120, a difference aware personal information manager 130, a difference unaware personal information manager 140, a difference unaware synchronization connector 150 and a difference aware synchronization connector 160.

A client 105 can connect to the various elements in the networking environment via a network 100, which is typically the internet, but can also be any network, including but not limited to any combination of a LAN, a MAN, a WAN, a mobile, wired or wireless network, a private network, or a virtual private network. While only a single client 105 is shown, it is understood that very large numbers (e.g., millions) of clients are supported and can be in communication with the networking environment at any time. The client 105 may include a variety of different computing devices. Examples of client devices 105 are personal computers, digital assistants, personal digital assistants, cellular phones, mobile phones, smart phones or laptop computers. As will be obvious to one of ordinary skill in the art, the present invention is not limited to the devices listed above. For purposes of convenience and description of one embodiment, the users of client 105 will be referred to as a "user" or "users."

The client 105 may include a browser application that allows users to access web pages associated with difference aware information repositories and difference unaware information repositories on the World Wide Web to access contact information stored in these repositories. Suitable browser applications are Microsoft Internet Explorer, Netscape Navigator, Mozilla Firefox, Apple Safari or any application adapted to allow access to web pages on the World Wide Web. In the context of the present invention for ease of description, difference aware information repositories and difference unaware information repositories will be referred to as, respectively, a difference aware personal information manager 130 and difference unaware personal information manager 140.

Difference aware personal information manager 130 and difference unaware personal information manager 140 are used to store contact information of various people. Generally, the difference aware personal information manager 130 and the difference unaware information manager 140 at a basic level function as a first and second database to store contact information for a user. The user accesses these managers to add, delete or edit contact information of people in order to keep an up to date record of the contact information. Keeping an up to date record of contact information allows users to easily contact friends, family or business associates when communication is needed. Difference aware personal information managers 130 are capable of determining changes to the stored contact information within. The difference aware personal information manager 130 records or tracks contact information that has been added, deleted or modified since a certain point in time. For example, if the user adds a new contact "Joe" or deletes contact "Mary" or adds a phone number for contact "John," the difference aware personal information manager 130 tracks these changes. An example web site for implementation of the difference aware personal information manager 130 is found at www.salesforce.com. Microsoft Outlook is an example of an electronic mail (e-mail) application that is representative of the difference aware personal information manager 130.

The difference aware personal information manager 130 is in communication with a first synchronization connector. Specifically the difference aware personal information manager 130 is in communication with a difference aware synchronization connector 160. In one embodiment, the difference aware personal information manager 130 never initiates communication with the difference aware synchronization connector 160. In order to establish communication with the difference aware personal information manager 130, the difference aware synchronization connector 160 sends a query to the difference aware personal information manager 130. The difference aware synchronization connector 160 is responsible for facilitating communication during synchronization between the difference aware personal information manager 130 and the master synchronization engine 110, which is further described below.

Figure 2:
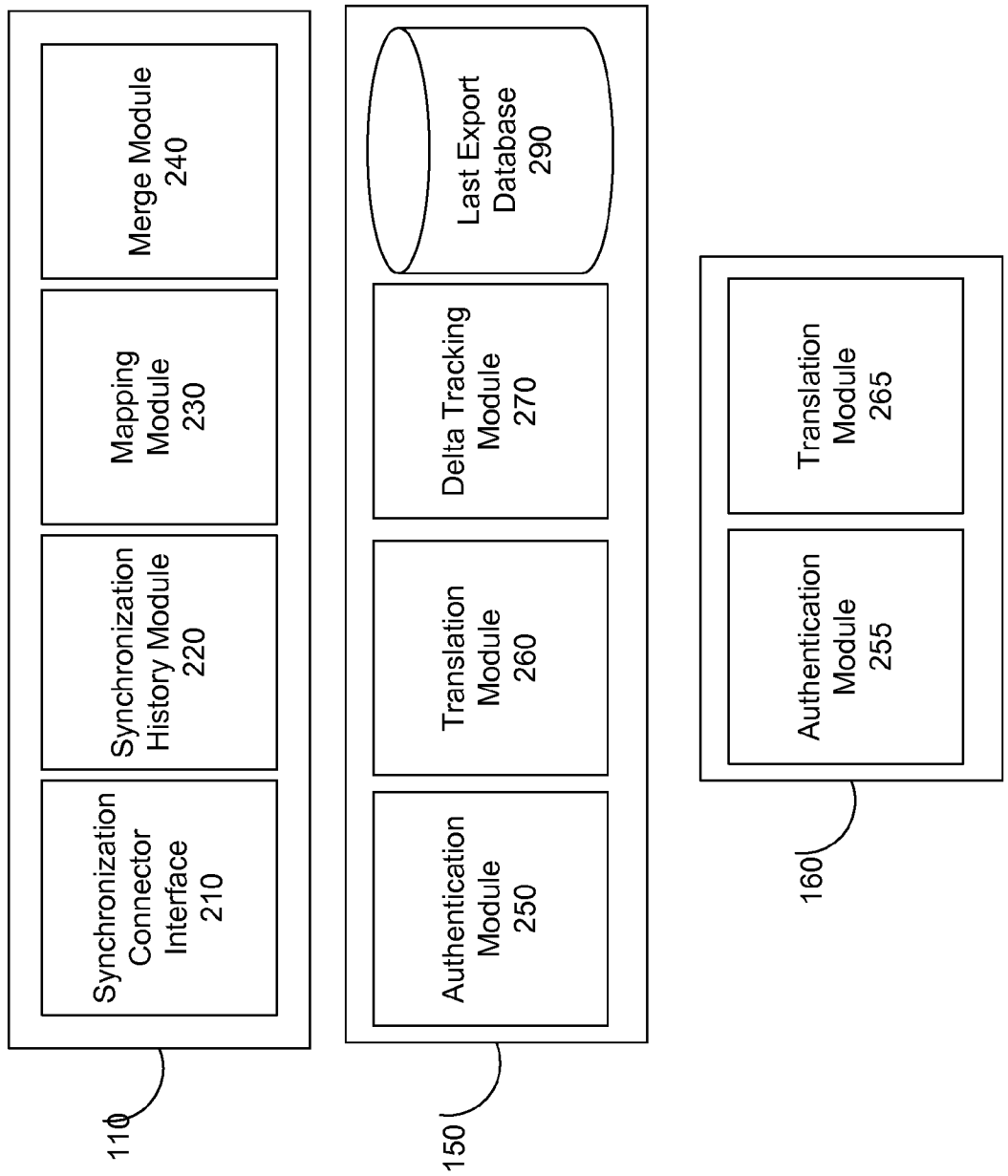
FIG. 2 illustrates one embodiment of a block diagram of the various modules comprised in elements.

Referring to FIG. 2, in one embodiment the difference aware synchronization connector 160 comprises an authentication module 255 and a translation module 265. The authentication module 255 of the difference aware synchronization connector 160 is responsible for authenticating the master synchronization engine 110 during synchronization with the difference aware personal information manager 130. The authentication module 255 ensures that only the appropriate elements (e.g., the master synchronization engine 110) are granted access to the contact information. Authentication may include, for example, receiving from the master synchronization engine 110 the correct user name and password to access the contact information stored in the difference aware personal information manager 130. Various other authentication mechanisms can be used that are known in the art, for example, anonymous, security token, PIN, fingerprint, retinal pattern, voice recognition, browser-based authentication, Kerberos etc.

The translation module 265 of the difference aware synchronization connector 160 is responsible for translation of the contact information form fields of the difference aware personal information manager 130 to the valid contact information form fields used in the master contact information database 120. For example, in the difference aware personal information manager 130, the form field for a person's home address may be labeled "Home Address" while the form field for the person's home address in the master database 120 is labeled "Residence." The translation module 265 resolves the discrepancies in form field titles during synchronization so that the master synchronization engine 110 is capable of understanding the received contact information. The translation module 265 undergoes an initialization process during the first synchronization with the master synchronization engine 110 to determine the breadth of the valid form fields used in the master contact information database 120. After the initialization process is completed, the translation module 265 is capable of translating the form fields used in the difference aware personal information manager 130 to the valid form fields in the master contact information database 120. The results of the initialization process are stored and may be used by the translation module 265 during future synchronization with the difference aware personal information manager 130.

Generally, the difference unaware personal information manager 140 is not structured to track changes that are made to the stored contact information. An export only personal information manager is one example of a difference unaware personal information manager 140 which functions as a database (e.g., repository) and stores contact information. An export only information manager is only capable of exporting the current state of the contact information during one way synchronization with the master synchronization engine 110. An example website implementation of an export only information manager is at www.linkedin.com. In one embodiment, the difference unaware information manager 140 is not structured to track changes that are made to the stored contact information, but permits export of contact information and can also import contact information based on user preference or commercial agreements allowing third parties to access the difference unaware information manager 140. Therefore, the difference unaware personal information manager 140 may be capable of receiving information, but one way synchronization still may be performed as the user may not want to make any changes to the contact information stored in the difference unaware personal information manager 140. An example web site for implementation of the difference unaware personal information manager 140 is www.gmail.com.

The difference unaware personal information manager 140 is in communication with a second synchronization connector. Specifically, the difference unaware personal information manager 140 is in communication with a difference unaware synchronization connector 150. In one embodiment, the difference unaware personal information manager 140 never initiates communication with the difference unaware synchronization connector 150. In order to establish communication with the difference unaware personal information manager 140, the difference unaware synchronization connector 150 sends a query to the difference unaware personal information manager 140. The difference unaware synchronization connector 150 is responsible for facilitating communication between the difference unaware information manager 140 and the master synchronization engine 110 and determining changes that occurred in the contact information since the last export. In one embodiment, the difference unaware synchronization connector 150 comprises an authentication module 250, a translation module 260, a delta tracking module 270 and a last export database 290.

The authentication module 250 and the translation module 260 of the difference unaware synchronization connector 150 perform similar functions described above pertaining to the authentication module 255 and the translation module 265 of the difference aware synchronization connector 160. The delta tracking module 270 is responsible for receiving requests from the master synchronization engine 110 for updates in the contact information. The delta tracking module 270 also receives the exported contact information from the difference unaware personal information manager 140 and determines the changes made since the last export of contact information. The delta tracking module 270 allows the difference unaware personal information manager 140 to appear to function as the difference aware personal information manager 130 by computing the changes in the contact information from the last (e.g., previous) export of contact information and the current export of contact information.

The last export database 290 is responsible for storing the received contact information from the difference unaware personal information manager 140. The contact information from the last (e.g., previous) export is used by the delta tracking module 270 to determine any changes made in the contact information compared to the contact information from the current export.

Accordingly, because contact information is stored in both the difference aware personal information manager 130 and the difference unaware personal information manager 140 a master contact information list is created from the compiled contact information from both the difference aware personal information manager 130 and the difference unaware personal information manager 140. The master contact information list is a centralized list representing the contact information stored in both the personal information manager 130 and the difference unaware personal information manager 140. The master contact information database 120 is responsible for storing the master contact information list.

The master synchronization engine 110 is responsible for conducting the process of updating the master contact information list. The master synchronization engine 110 is the only mechanism which is capable of updating the master contact information list stored in the master contact information database 120. In one embodiment, the master synchronization engine 110 comprises a synchronization connector interface 210, a synchronization history module 220, a mapping module 230 and a merge module 240. The synchronization connector interface 210 allows the master synchronization engine 110 to synchronize with the difference aware personal information manager 130 and the difference unaware personal information manager 140 via their respective connectors.

The synchronization history module 220 is responsible for tracking the time and date of the last synchronization with connectors 150 and 160. Based on an elapsed time since the last synchronization took place, the master synchronization engine 110 will request the current contact information from the difference aware personal information manager 130 and the difference unaware personal information manager 140. In one embodiment, the request can occur at a predetermined time after the last request or synchronization occurred, for example, one week from the previous request. Any alternative time intervals can be used to generate the request for the contact information which is further described below.

The mapping module 230 is responsible for mapping the received contact information from the difference aware personal information manager 130 and the difference unaware personal information manager 140 to the appropriate form fields in the master contact information database 120 to update the master contact information list. The mapping module 230 maps the received contact information to the valid form fields associated with the correct person based on a unique identifier number that associates contact information with the corresponding person.

The merge module 240 is responsible for merging contact information received from the difference aware personal information manager 130 and from the difference unaware personal information manager 140 associated with the same data record. The merge module 240 determines potential duplicates of received contact information from entries in the difference aware personal information manager 130 and the difference unaware personal information manager 140 that may be merged to create a single entry. For example, the merge module 240 can determine that unique contact information (e.g., email address) associated with "Joe Stevens" in the difference aware personal information manager 130 and the unique contact information (e.g., email address) associated with "Joe Stevens" in the difference unaware personal information manager 140 are associated with the same person and the received entries from both information managers may be merged when updating the master contact information list. The merge module 240 determines, based on predetermined policies (or rules), how the duplicate contact information will be merged during the update of the master contact information list.

While only a single difference aware personal information manager 130 and a single difference unaware personal information manager 140 is shown, it is understood that a plurality of personal information managers are supported and can be in communication with the networking environment at any time. The number of personal information managers present may depend on the number of locations in which a user has stored contact information. Additionally, any combination of difference aware personal information managers 130 and difference unaware personal information managers 140 are supported. For example, a user can choose to only store contact information in difference unaware personal information managers or in difference aware personal information managers or a combination of the two managers. In the context of the present discussion, the description uses only a single difference aware personal information manager 130 and a single difference unaware personal information manager 140 to help ease understanding of its configuration and process.

It is noted that the various modules described may be implemented as part of a computer program product executed as instructions by a process, for example, on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

Acquisition of Contact Information

The master synchronization engine 110 facilitates the process of updating the master contact information list stored in the master contact information database 120. The process performed by the master synchronization engine 110 to update the master contact information list is further described below.

Figure 3:
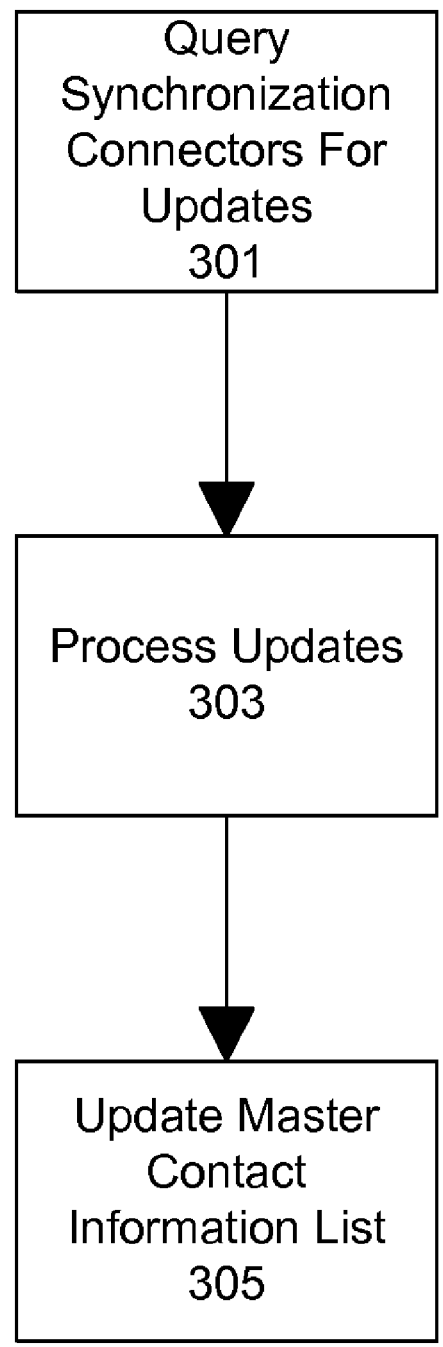
FIG. 3 illustrates a flow diagram of one embodiment of a process for updating a master contact information list.

Referring now to FIG. 3, the master synchronization engine 110 performs the functional stages to update the master contact information list: 301: Query synchronization connectors for updates; 303: Process updates; and 305: Update master contact information list. Each of these steps will now be described in further detail.

Stage 1

At the first stage 301, the master synchronization engine 110 queries the difference aware synchronization connector 160 and the difference unaware synchronization connector 150 for updates in contact information stored in the difference aware personal information manager 130 and the difference unaware personal information manager 140. Specifically, the synchronization history module 220 first determines when the last synchronization occurred between the difference aware personal information manager 130 and the difference unaware personal information manager 140. The synchronization history module tracks the time and date of synchronization with the personal information managers in order to determine when the next synchronization should occur in order to update the master contact information list.

In one embodiment, the synchronization history module 220 requests updates from the difference aware synchronization connector 160 and the difference unaware synchronization connector 150 after a predetermined time has elapsed since the last request. For example, the synchronization history module 220 may issue requests after one week has elapsed since the last synchronization. Any suitable time interval can be used to determine when synchronization should occur. Alternatively, in one embodiment the synchronization time can be dynamic depending on the user whose master contact information list is being updated. Some users may actively update their contact information at the difference aware personal information manager 130 and difference unaware personal information manager 140 on a daily basis so synchronization would occur at a shorter time interval compared to users who only update contact information only once a month. In an alternative embodiment, the synchronization time can be dynamic depending on the frequency of changes to contact information stored in one of the personal information managers.

The synchronization history module 220 can determine that a user is actively updating one personal information manager more frequently than the other, thus requests for updated contact information would occur at a shorter time interval to the more frequently modified personal information manager. In another alternative embodiment, the difference aware personal information manager 130 and the difference unaware personal information manager 140 notifies their respective connector that contact information has been added, deleted or modified. This notification prompts the difference aware synchronization connector 160 and the difference unaware synchronization connector 150 to request contact information from their respective information managers once authentication, which is further described below, is complete.

If the synchronization history module 220 determines that the appropriate time criteria has been satisfied, a request is sent to the difference aware synchronization connector 160 and the difference unaware synchronization connector 150 for updates from their respective personal information manager. The synchronization connector interface 210 allows the master synchronization engine 110 to synchronize with the difference aware personal information manager 130 and the difference unaware personal information manager 140 via their respective connectors. In an alternative embodiment, if the difference aware synchronization connector 160 and the difference unaware synchronization connector 150 determines (e.g., from the notification of their respective personal information managers) the possibility that the contact information in their respective personal information managers has changed, the synchronization connectors 150 and 160 sends a request for the stored contact information.

The synchronization connector interface 210 communicates with the authentication module 250 of the difference unaware synchronization connector 150 and the authentication module 255 of the difference aware personal information manager before synchronization can begin. The authentication module 255 and 250 ensures that only the appropriate elements (e.g., master synchronization engine 110) are granted access to the contact information. The authentication modules 255 and 250 provide security features that prevent unauthorized access to the personal information managers. Authentication may include, for example, receiving from the master synchronization engine 110 the correct user name and password to access the contact information stored in the difference aware personal information manager 130 and the difference unaware personal information manager 140. As previously discussed above, various other authentication mechanisms can be used that are known in the art. Once the master synchronization engine 110 is authorized to access the contact information stored in the personal information managers, the master synchronization engine 110 sends the request for the contact information to the difference aware synchronization connector 160 and the difference unaware synchronization connector 150.

Stage 2

At the second stage 303, the master synchronization engine 110 processes and receives the updates in contact information from the difference aware personal information manager 130 and the difference unaware personal information manager 140 after authorization is allowed. Generally, after the master synchronization engine 110 has been granted access to the contact information within the difference aware personal information manager 130 and the difference unaware personal information manager 150, the difference aware synchronization connector 160 and the difference unaware synchronization connector 150 forwards the request for contact information to their respective personal information manager.

The difference aware personal information manager 130 is capable of determining changes to the stored contact information. The difference aware personal information manager 130 records or tracks contact information that has been added, deleted or modified since the last synchronization as is known in the art. These changes may be referred to as deltas (e.g., changes or differences between compared fields or values) of contact information. Only these deltas are exported to the difference aware synchronization connector 160 in response to the request for the updated contact information. Exporting only the deltas is advantageous as less processing power is needed by the system to update the master contact information list because the entire contact information list does not need to be updated. Updating only the deltas is a more efficient method for updating the master contact information list as fewer changes need to occur in the master contact information list compared to constantly updating the entire list. Only contact information that was added, deleted, or modified needs to be accounted for. Any contact information that was not edited is ignored during the update.

After the difference aware synchronization connector 160 receives the changes in the contact information or deltas, the translation module 265 begins to translate the received contact information into the appropriate format so that the master database 120 will be able to comprehend the contact information. The translation module 265 converts only the form fields associated with the received deltas during the current synchronization with the difference aware personal information manager 130 into the valid form fields used in the master database 120. For example, the difference aware personal synchronization connector 160 may receive a phone number that is stored in the difference aware personal information manager 130 in the form field "Business Ph" while the corresponding form field in the master contact information database 120 is labeled "Work Ph." The translation module 265 identifies the valid form fields used in the master contact information database 120 and converts the form fields from the difference aware personal information manager 130 to the valid form fields used in the master contact information database 120. The translation module 265 undergoes an initialization process to determine the breadth of the valid form fields in the master database 120 during the first synchronization with the master synchronization engine 110.

During the first synchronization with the master synchronization engine 110, the translation module 265 queries the master synchronization engine 110 for the list of valid form fields used in the master contact information database 120. The translation module 265 associates the form fields in the difference aware personal information manager 130 with the corresponding form fields in the master contact information database 120 based on a stored table with common form field titles. The form field table lists all applicable form field titles which are commonly used. For example, the difference aware personal information manager 130 uses the form field "Home Ph" which is associated with the form fields "Residence Ph."

"House Ph," or "Personal Ph" in the form field table. The translation module 265 analyzes the valid form fields in the master database 120 and matches valid form fields across form fields used in the form field table to determine the correct form field titles to associate with the form fields used in the difference aware personal information manager 130. Once the translation module 265 finishes converting the form fields associated with the received contact information into the valid form fields used in the master contact information database 120, the difference aware synchronization connector 160 forwards the contact information to the master synchronization engine.

Unlike the difference aware personal information manager 130, the difference unaware personal information manager 140 is not capable of determining the deltas (e.g., changes) made to the contact information since the previous export. The difference unaware personal information manager 140 is only capable of exporting the current state of all the stored contact information during one way synchronization. In one way synchronization, the difference unaware personal information manager 140 exports the stored contact information to the difference unaware synchronization connector 150 which determines the changes (e.g., deltas or differences) made to the contact information (e.g., an "export only" configuration). The process of determining the changes made to the contact information allows the difference unaware personal information manager 140 to appear to function as the difference aware personal information manager 130. The retrieval of contact information from the difference unaware personal information manager 140 is further described below.

Figure 4:
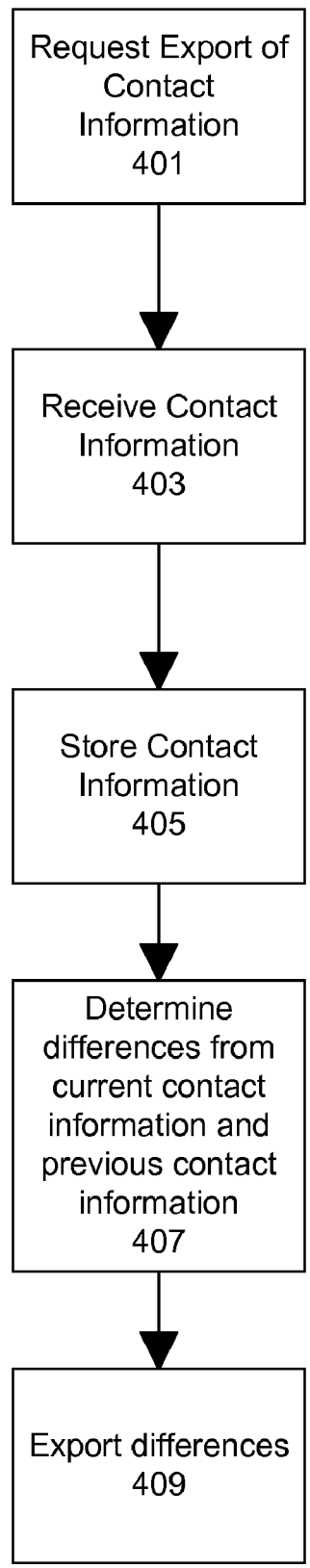
FIG. 4 illustrates a flow diagram of one embodiment of a process for determining changes in stored contact information from a difference unaware information repository.

The delta tracking module 270 in the difference unaware synchronization connector 150 is responsible for determining the changes (e.g., deltas or differences) made to the contact information in the difference unaware personal information manager 140 since the previous export. The delta tracking module 270 allows the difference unaware personal information manager 140 to appear to function as the difference aware personal information manger 130 even though the difference unaware personal information manager 140 is only capable of exporting the contact information. Referring to FIG. 4, the delta tracking module 270 determines the changes (or deltas) through a process that includes: 401: Request export of contact information; 403: Receive contact information; 405: Store contact information; 407: Determine differences from current contact information and previous contact information; and 409: Export differences.

Referring to FIG. 4, in step 401 the delta tracking module 270 in the difference unaware synchronization connector 150 receives the request for contact information from the master synchronization engine 110. The delta tracking module 270 then forwards the request for contact information to the difference unaware personal information manager 140.

In step 403, the delta tracking module 270 receives the exported contact information. After the delta tracking module 270 forwards the request from step 401 to the difference unaware information manager 140, the difference unaware personal information manager 140 exports (or dumps) all the stored contact information to the delta tracking module 270. As previously discussed above, the difference unaware personal information manager 140 is not structured to determine changes made to contact information. Therefore, the difference unaware personal information manager 140 simply exports all the stored contact information to the delta tracking module 270.

In step 405, the delta tracking module 270 stores the received contact information in the last export database 290. The last export database 290 stores the contact information each time the delta tracking module 270 receives contact information. In one embodiment, the contact information from each previous export is stored in the last export database 290 to maintain a record of all the information exported from the difference unaware personal information manager 140. Maintaining a record of all the information obtained from previous exports provides a history of all the contact information. The history can be used to restore the contact information to a previous state or to access old contact information. In alternative embodiments, after the deltas are determined in step 407, which is further described below, the contact information from the previous export is purged and only the contact information from the current export is maintained in the last export database 290. This beneficially frees storage space in the last export database 290 and allows for the usage of smaller memory.

In step 407, the delta tracking module 270 determines the deltas or changes in the contact information from the current export of contact information compared to the previous export of contact information. Determining the deltas allows only changes in the contact information to be exported to the master synchronization engine 110. Exporting only the deltas is advantageous as less processing power is needed to update the master contact information list because the entire contact information list does not need to be updated. Updating only the deltas is a more efficient method for updating the master contact information list as fewer changes would need to be made to the master contact information list compared to constantly updating the entire list. Only contact information that was added deleted or modified needs to be accounted for. Any contact information that was not edited is ignored during the update. Additionally, determining the deltas allows one way synchronization that supports the tracking of edits and/or deletions of contact information from the difference unaware personal information manager 140.

Figure 5:
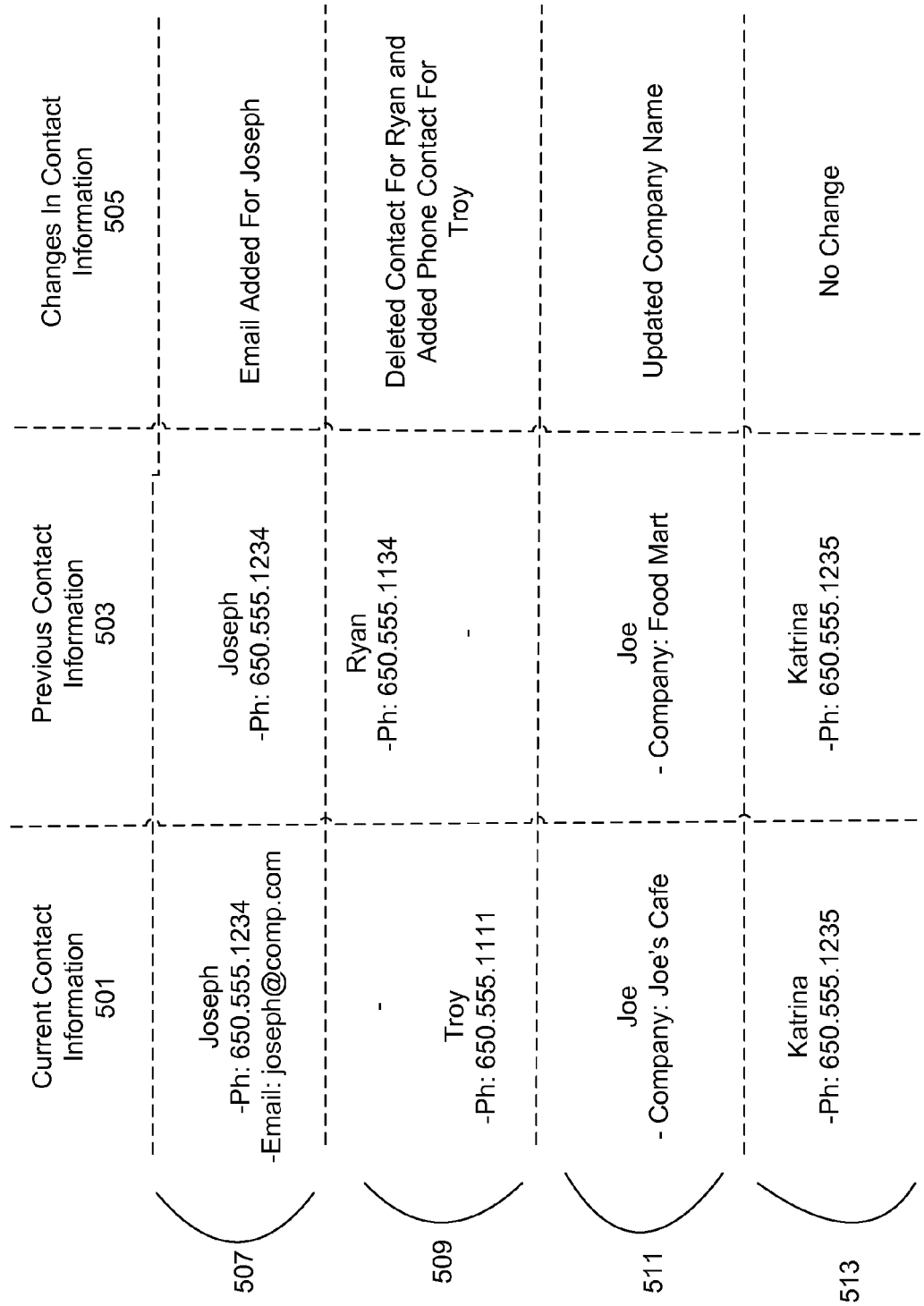
FIG. 5 illustrates a diagram of one embodiment of a process for determining changes in stored contact information from a difference unaware information repository.

Referring to FIG. 5, there is shown a diagram illustrative of one embodiment of the process used to determine the changes or deltas in contact information. In one embodiment, the delta tracking module 270 compares the received contact information with the previous contact information in a record by record basis. Each record is associated with a particular contact and contains form fields containing information pertaining to the contact such as their home address, business address, e-mail address, home phone number, work phone number, cellular number, etc. The delta tracking module compares each record of the received contact information with the corresponding record from the previous export to determine the changes or deltas made in the contact information.

In FIG. 5, column 501 represents the current contact information received in step 403 which is now stored in the last export database 290. Column 503 represents the contact information stored in the last export database 290 from the last (e.g., previous) export of contact information. Rows 507, 509, 511 and 513 are representative of the data records from each export. For example, referring to row 507, the previous contact information 503 shows that a data record for "Joseph" lists a phone number, while the current contact information 501 illustrates the same phone number from the previous contact information 503 and the addition of an email address Joseph@comp.com. The delta tracking module 270 compares the data record in row 507 from the current contact information 501 and the previous contact information 503 to determine the delta or changes that occurred. Column 505 representing the changing in contact information illustrates that an email contact for "Joseph" was added.

In another example, row 509 is an example of data records being added and deleted. Row 509 and column 503 illustrates that in the previous export of contact information, the data record contained a phone number for "Ryan." Referring now to column 501, the data record from the current export of contact information no longer contains a data record for a phone number for "Ryan." Instead a phone number for a new contact "Troy" has been added. The delta tracking module 270 compares the data records of row 509 from the current contact information 501 and the previous contact information 503 to determine the changes in contact information 505. Column 505 illustrates that the contact for "Ryan" was deleted while a phone number for a new contact "Troy" was added.

Row 511 is representative of contact information being edited since the previous export of contact information. During the previous export, the previous contact information 503 contained a company name of "Food Mart" for the contact "Joe." The current contact information 501 now contains the company name "Joe's Café" for the contact "Joe." The user modified the company associated with the contact "Joe" as the contact may have moved to a new company or changed the name of his business. The delta tracking module 270 compares the data records of row 511 from the current contact information 501 and the previous contact information 503 to determine the changes in contact information 505. Column 505 illustrates that the company name for "Joe" was updated and the data record associated with the contact "Joe" now contains the company name "Joe's Café."

Row 513 is representative of no changes being made to the contact information associated with the data record of row 513. The previous contact information 503 and current contact information 501 both contain the same phone number for the contact "Katrina." Therefore, the delta tracking module 270 determines that no changes or updates were made to the data record of row 513.

In step 409, once the delta tracking module 270 has completed the determination of all the changes that occurred since the last export of contact information, the delta tracking module 270 prepares to export the determined deltas represented in column 505. As described above in regards to the translation module 265 of the difference aware synchronization connector 160, the translation module 260 of the difference unaware synchronization connector 150 translates the determined changes (or deltas) in contact information from the previous step 407 into the appropriate format. Translation occurs so that the master database 120 comprehends the contact information. The translation module 260 converts the form fields associated with the determined changes (or deltas) in contact information into the valid form fields used in the master contact information database 120. For example, the difference unaware personal information manager 130 may store a phone number to the form field "Business Ph" while the corresponding form field in the master contact information database 120 is labeled "Work Ph." The translation module 260 is aware of the valid form fields used in the master database 120 and converts the form fields from the difference unaware personal information manager 140 to the valid form fields used in the master contact information database 120. The translation module 260 of the difference unaware synchronization connector 150 undergoes an initialization process as previously described above in regards to the translation module 265 of the difference aware synchronization connector 160 to determine the breadth of the valid form fields in the master database 120 during the very first synchronization with the master synchronization engine 110. Once the translation module 260 finishes converting the form fields associated with the determined changes or deltas in contact information, the difference unaware synchronization connector 160 forwards the contact information to the master synchronization engine 110.

At this stage, the master synchronization engine 110 has received all the updates that occurred since the last (e.g., previous) synchronization with the difference aware personal information manager 130 and the difference unaware personal information manager 140. The master synchronization engine 110 can begin to update the master contact information list as further described below.

Stage 3

At the third stage 305, the master synchronization engine 110 begins to update the master contact information list stored in the master contact information database 120 using the merge module 240. The merge module 240 processes any conflicts that may arise during the merging of contact information from the personal information managers. Conflicts can include handling duplicate data entries and merging contact information associated with the same data record.

The merge module 240 first begins to identify and group duplicate updates in contact information from the difference aware personal information manager 130 and the difference unaware personal information manager 140. Additionally, the merge module 240 begins to merge contact information from the difference aware personal information manager 130 and the difference unaware persona information manager 140 that is associated with the same data record. For example, the master synchronization engine 110 may have received a phone number update for the contact "Troy" from the difference aware personal information manager 130 and may also have received an email update for "Troy" from the difference unaware personal information manager 130. In the situation where the changes made to each information manager are not reflected in the other manager, the merge module 240 merges or combines the two updates into a single entry which will be used to update the master contact information list.

The merge module 240 is configured to perform the processes described above using policies or rules on how data will be treated in the event of conflict resolution in a merge context. An example configuration for a merge module is described in U.S. patent application Ser. No. 10/703,949, entitled "Synchronization and Merge Engines," by inventors Cameron T. Ring, Joseph B. Shear, John T. Masonis, Ryan A. King and Richard J. Carey, and assigned to the same assignee as the present invention, the contents of which are herein incorporated by reference.

After the merge module 240 resolves the conflicts previously discussed above, the mapping module 230 maps the updated contact information to the appropriate form fields in the master contact information database 120 to update the master contact information list. In one embodiment, the mapping module 230 maps each record containing the changes in contact information for a particular contact to the appropriate record in the master contact information database 120 based on the unique identifier associated with the contact. In one embodiment, the unique identifier is an email address. Alternatives implementations of the unique identifier may include a unique number identifier (e.g., student identification number or employee number). For example, the record of "Joe Smith" is associated with a unique identifier number "100" or "jsmith@myemail.com." The mapping module identifies the unique identifier associated with the contact information entry and maps the entry to the correct location in the master contact information database 120 to update the master contact information list. In one embodiment, the correct location in the master contact information database 120 is associated with the same unique identifier used in master synchronization engine 110. In an alternative embodiment, the unique identifier for each record in the master synchronization engine 110 has an associated, but different unique identifier in the master contact information database 120. In another embodiment, each contact information field is assigned the same unique identifier as the contact to associate the contact information with the correct person. Each contact information field is then mapped to the correct contact information field based on the unique identifier. In alternative embodiments, the unique identifier can be a variable or any identifier that can be used to associate contact information with a particular person.

After the mapping module 230 maps all the contact information acquired during synchronization with the difference aware personal information manager 130 and the difference unaware personal information manager 140, an update of the master contact information list is complete. A centralized list reflecting all contact information across the difference aware personal information manager 130 and difference unaware personal information manager is reflected in the master contact information list. The master contact information list beneficially provides an accurate list of every contact available to the user and can be used to update the personal information managers, if appropriate.

In one embodiment, after the master contact information list has been updated, the master synchronization engine 110 synchronizes with the difference aware synchronization connector 160. After synchronization and authentication as previously discussed above is complete, the master synchronization engine 110 forwards the updated master contact information list to the difference aware synchronization connector 160. The difference aware synchronization connector 160 forwards the updated contact information to the difference aware personal information manager 130. The difference aware personal information manager 130 replaces the contact information with the newly acquired updated master contact information list. In alternative embodiments, only the changes (or deltas) reflected in the difference unaware personal information manager 140 are forwarded to the difference aware personal information manager 130. The changes (or deltas) in the difference unaware personal information manager 140 are then incorporated in the difference aware personal information manager 130.

As previously discussed, the difference unaware personal information manager 140 may not be capable of receiving updates from an external source other than the user associated with the difference unaware personal information manager 140 because of commercial agreements or lack of functionality. Therefore, the updated contact information list is not reflected in the contact information stored in the difference unaware personal information manager 140. In alternative embodiments, an agreement may be made between a provider of the master contact information database 120 and the provider of the difference unaware contact information manager 140 to allow the provider of master contact information database 120 access to the difference unaware personal information manager 140 via an application programming interface (API). The API can be utilized to allow the difference unaware information manager 140 to be updated with the contact information as previously described above in regards to the difference aware personal information manager 130.

Upon reading this disclosure, those of skill in the art will appreciate that though the disclosure above pertains to determining changes in contact information from a difference unaware information repository, the teachings disclosed can be applied to any data retrieved from a difference unaware information repository such as calendar entries. The features described herein beneficially provide a system and method to effectively track changes of data within a difference unaware information repository. Tracking changes of data within the difference unaware information repository provides an efficient method of updating a master contact information list. Updating the master contact information list no longer requires constant updates of the entire list. Only the changes made to the data are accounted for resulting in quicker and much more efficient updates of the master contact information list. Additionally, the master contact information list is accurately maintained accounting for every change in the stored data such as edits and/or deletions of contact information in the difference unaware information repository.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining changes or deltas in contact information from a difference unaware data repository through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A synchronization method comprising:
   storing, in a memory associated with a first computer, a previous export of contact information received from a memory with a difference unaware information repository, the difference unaware information repository configured to export a current state of contact information;
   receiving, from a master synchronization computer, a request for synchronization;
   receiving, from the master synchronization computer, a request for changes in contact information;
   requesting, by the first computer, an export of current contact information from the difference unaware information repository;
   receiving, from the difference unaware information repository, the export of the current contact information from the difference unaware information repository;
   comparing, at the first computer, each field from the export of the current contact information with a corresponding field from the previous export of contact information; and
   determining, by the first computer, changes from the previous export of contact information.

2. The method of claim 1, further comprising storing, in the memory associated with the first computer, the export of the current contact information from the difference unaware information repository.

3. The method of claim 1, wherein determining, by the first computer, changes from the previous export of contact information further comprises:
   determining added contact information;
   determining deleted contact information; and
   determining revisions to contact information from the previous export of contact information.

4. The method of claim 1, further comprising ignoring contact information that was not modified since the previous export of contact information.

5. The method of claim 1, further comprising exporting the determined changes from the previous export of contact information to the master synchronization computer.

6. A computer readable medium storing a computer program product configured to store instructions, the instructions when executed by a processor cause the processor to:
   store a previous export of contact information received from a memory with a difference unaware information repository;
   receive a notification that a change in contact information maintained in the memory with the difference unaware information repository has occurred;
   request a current export of current contact information from the memory of the difference unaware information repository;
   receive the current export of the current contact information maintained in the memory with the difference unaware information repository;
   compare each field from the current export of the current contact information with a corresponding field from the previous export of contact information received from the memory with the difference unaware information repository;
   determine changes from the previous export of contact information; and
   store the current export of contact information received from the memory with the difference unaware information repository as the previous export of contact information.

7. The computer readable medium of claim 6, the instructions when executed by the processor further cause the processor to:
   request changes in contact information from a first information repository;
   receive changes from a previous export of associated contact information stored in the first information repository;
   map the received changes since the previous export of associated contact information from the first information repository to corresponding form fields in a master contact information list to create an updated master contact information list; and
   save the updated master contact information list.

8. The computer readable medium of claim 7, the instructions when executed by the processor further cause the processor to determine a most recent synchronization time with the first information repository.

9. The computer readable medium of claim 7, wherein the first information repository is configured to track changes in contact information for each contact information entry within its own repository.

10. The computer readable medium of claim 7, the instructions when executed by the processor further cause the processor to store a time and date of the previous export of contact information from the first information repository.

11. The computer readable medium of claim 6, the instructions when executed by the processor further cause the processor to determine a most recent synchronization time with the difference unaware information repository.

12. The computer readable medium of claim 6, the instructions when executed by the processor further cause the processor to store a time and date of the previous export of contact information from the difference unaware information repository.

13. The computer readable medium of claim 6, wherein the compare each field from the current export of the current contact information with a corresponding field from the previous export of contact information received from the memory with the difference unaware information repository comprises determining related information using merge techniques.

14. A computer readable medium storing a computer program product configured to store instructions, the instructions when executed by a processor cause the processor to:
   store a previous export of contact information received from a memory with a difference unaware information repository;
   receive a request for changes in contact information maintained in the memory with the difference unaware information repository;
   request a current export of current contact information from the memory of the difference unaware information repository;
   receive the current export of the current contact information maintained in the memory with the difference unaware information repository;
   compare each field from the current export of the current contact information with a corresponding field from the previous export of contact information received from the memory with the difference unaware information repository;
   determine changes from the previous export of contact information;
   export the determined changes from the previous export of contact information to a second computer; and store the current export of contact information received from the memory with the difference unaware information repository as the previous export of contact information.

15. The computer readable medium of claim 14, wherein the determine changes from the previous export of contact information further comprises:
    determining added contact information;
    determining deleted contact information; and
    determining revisions to contact information from the previous export of contact information.

16. The computer readable medium of claim 14, the instructions when executed by the processor further cause the processor to ignore contact information that was not modified since the previous export of contact information.

17. A method comprising:
    storing, in a memory associated with a first computer, a previous export of contact information received from a memory with a difference unaware information repository;
    receiving, at the first computer from a second computer, a request for changes in contact information maintained in the memory with the difference unaware information repository;
    requesting, by the first computer to the difference unaware information repository, a current export of current contact information from the memory of the difference unaware information repository;
    receiving, at the first computer from the memory with the difference unaware information repository, the current export of the current contact information maintained in the memory with the difference unaware information repository;
    comparing, at the first computer, each field from the current export of the current contact information with a corresponding field from the previous export of contact information received from the memory with the difference unaware information repository;
    determining, by the first computer, changes from the previous export of contact information;
    exporting the determined changes from the previous export of contact information to a second computer; and
    storing, in the memory associated with the first computer, the current export of contact information received from the memory with the difference unaware information repository as the previous export of contact information.

18. The method of claim 17, wherein the requesting, by the first computer to the difference unaware information repository, the current export of current contact information from the memory of the difference unaware information repository is dependent upon the frequency of changes to contact information maintained in the memory of the difference unaware information repository.

19. The method of claim 17, wherein the determined changes from the previous export of contact information are modifications of the contact information.

20. The method of claim 17, wherein determining, by the first computer, changes from the previous export of contact information further comprises:
    determining added contact information;
    determining deleted contact information; and
    determining revisions to contact information from the previous export of contact information.

21. The method of claim 17, further comprising ignoring contact information that was not modified since the previous export of contact information.

22. A method comprising:
    storing, in a memory associated with a first computer, a previous export of contact information received from a memory with a difference unaware information repository;
    receiving, at the first computer from the difference unaware information repository, a notification that a change in contact information maintained in the memory with the difference unaware information repository has occurred;
    requesting, by the first computer to the difference unaware information repository, a current export of current contact information from the memory of the difference unaware information repository;
    receiving, at the first computer from the memory with the difference unaware information repository, the current export of the current contact information maintained in the memory with the difference unaware information repository;
    comparing, at the first computer, each field from the current export of the current contact information with a corresponding field from the previous export of contact information received from the memory with the difference unaware information repository;
    determining, by the first computer, changes from the previous export of contact information; and
    storing, in the memory associated with the first computer, the current export of contact information received from the memory with the difference unaware information repository as the previous export of contact information.

23. The method of claim 22, wherein the requesting, by the first computer to the difference unaware information repository, the current export of current contact information from the memory of the difference unaware information repository is dependent upon the frequency of changes to contact information maintained in the memory of the difference unaware information repository.

24. The method of claim 22, wherein the change in contact information is a modification of the contact information.

25. The method of claim 22, wherein determining, by the first computer, changes from the previous export of contact information further comprises:
    determining added contact information;
    determining deleted contact information; and
    determining revisions to contact information from the previous export of contact information.

26. The method of claim 22, further comprising ignoring contact information that was not modified since the previous export of contact information.

27. An apparatus comprising:
    at least one processor; and
    at least one memory storing instructions, the instructions when executed by the at least one processor cause the at least one processor to:
        store a previous export of contact information received from a memory with a difference unaware information repository;
        receive a request for changes in contact information maintained in the memory with the difference unaware information repository;
        request a current export of current contact information from the memory of the difference unaware information repository;
        receive the current export of the current contact information maintained in the memory with the difference unaware information repository;
        compare each field from the current export of the current contact information with a corresponding field from the previous export of contact information received from the memory with the difference unaware information repository;

determine changes from the previous export of contact information;

export the determined changes from the previous export of contact information to a second computer; and store the current export of contact information received from the memory with the difference unaware information repository as the previous export of contact information.

28. The apparatus of claim 27, wherein the request the current export of current contact information from the memory of the difference unaware information repository is dependent upon the frequency of changes to contact information maintained in the memory of the difference unaware information repository.

29. The apparatus of claim 27, wherein the determined changes from the previous export of contact information are modifications of the contact information.

30. The apparatus of claim 27, wherein the determine changes from the previous export of contact information further comprises:

determine added contact information;

determine deleted contact information; and determine revisions to contact information from the previous export of contact information.

* * * * *